March 19, 1929. C. R. MARTINEAU Re. 17,241

CHECK PROTECTING DEVICE

Original Filed May 6, 1925 2 Sheets-Sheet 1

Inventor:
Clarence R. Martineau
by B. B. Stickney
Attorney.

March 19, 1929. C. R. MARTINEAU Re. 17,241

CHECK PROTECTING DEVICE

Original Filed May 6, 1925 2 Sheets-Sheet 2

Inventor

Clarence R. Martineau by B. B. Stickney

Attorney

Reissued Mar. 19, 1929. Re. 17,241

UNITED STATES PATENT OFFICE.

CLARENCE R. MARTINEAU, OF ALBANY, NEW YORK.

CHECK-PROTECTING DEVICE.

Original No. 1,578,289, dated March 30, 1926, Serial No. 28,330, filed May 6, 1925. Application for reissue filed July 8, 1926. Serial No. 121,225.

Reference may be had to the accompanying drawings, and the reference characters marked thereon, which form a part of the specification. Similar characters refer to similar parts in the several figures therein.

The principal object of this invention is to render evident upon casual inspection the tampering with a check, seal, memorandum or the like.

The invention is useful, for example, in connection with a common hasp which is locked by means of a bolt or pin. According to the present improvements, a seal or check is used to prevent said bolt or hasp pin from being released. A check or seal is used which is stiff enough for locking purposes, but yielding enough for mutilation; and so long as the seal is in place, it prevents the release of the bolt. The lock could not be opened even once without affording detection, which detection is due to the action of the remaining members of the device upon the seal, which occurs in the operation of withdrawing the seal to release the bolt, so that the seal itself indicates that the lock has been opened, or forms a detector for the purpose. So long as the seal is in place and intact, the device remains locked, and information is constantly and automatically afforded that the lock has not been unlocked.

Other objects will appear in connection with the following description.

Figure 1:
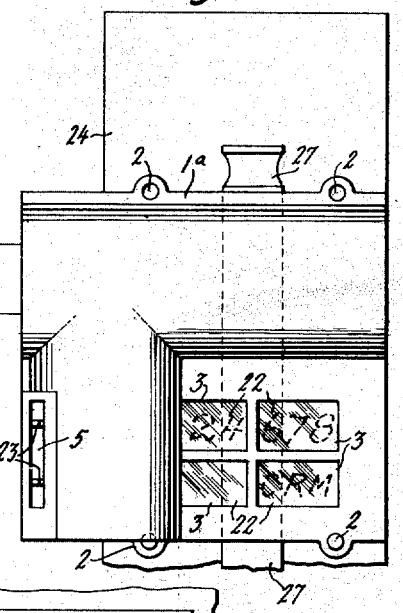
Figure 1 is a view in front elevation of my improved protecting device.
Figure 2:
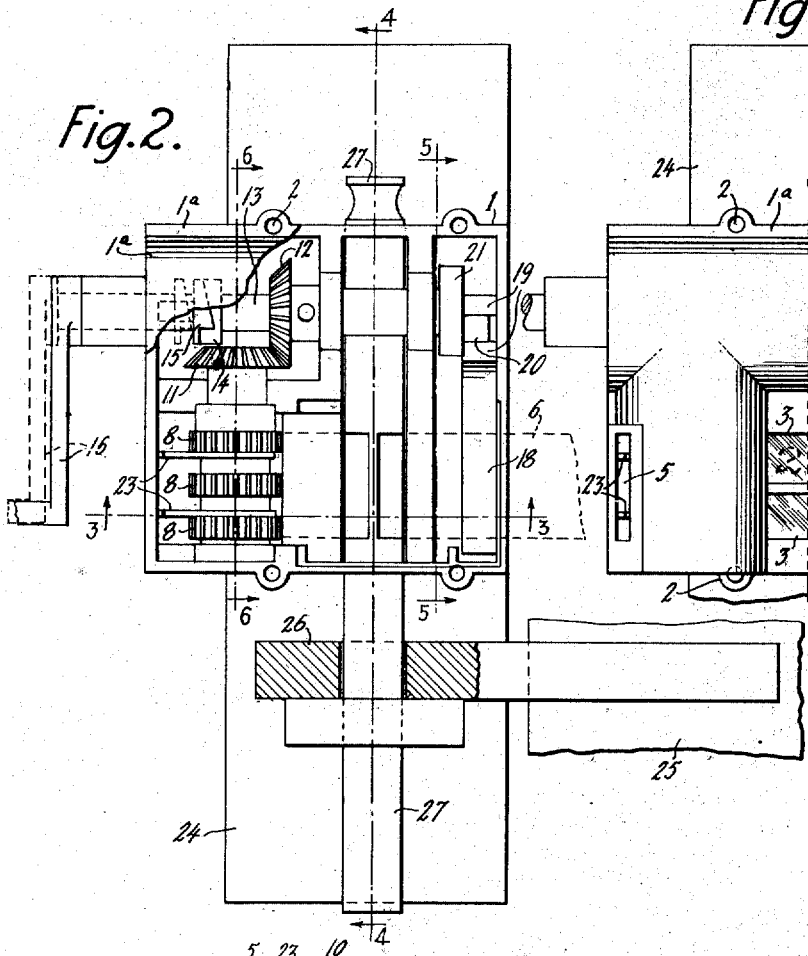
Figure 2 is a similar view with the cover of the enclosure partly broken away.
Figure 3:
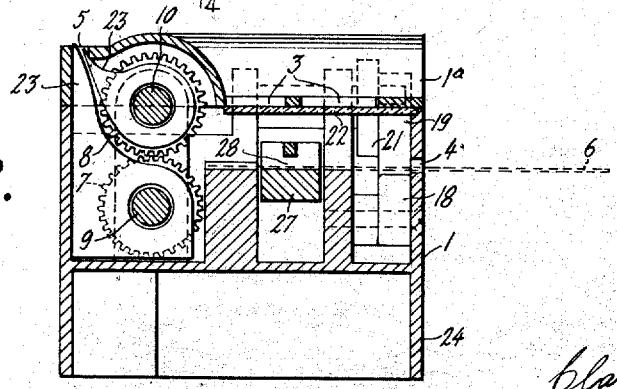
Figure 3 is a horizontal cross section of the same taken on the broken line 3—3 in Figure 2.

Referring to the drawings wherein the invention is shown in preferred form, 1 is an enclosure having a cover, $1^a$, secured to the body of the enclosure by screws, 2, the heads of which are concealed, or by other means whereby the cover cannot be readily removed.

The enclosure is provided with an inspection opening, 3, and with an inlet opening, 4, and an outlet opening, 5, at opposite ends of a path or passageway through the enclosure for a check, 6, whereby a check located in such passageway is subject to inspection through the opening, 3.

In said path of the check are rotatively mounted one or more pairs of toothed-wheels, 7 and 8, the members of each pair being on opposite sides of said path.

The toothed-wheel or wheels, 7, are mounted upon a shaft, 9, rotatory in bearings in the wall of the enclosure; and the toothed-wheel or wheels, 8, are mounted upon a shaft, 10, rotatory in bearings in the wall of the enclosure.

The toothed-wheels, 7 and 8, are so associated with one another that one of the pair serves to drive the other, particularly when a check, 6, is interposed between them; and when thus driven they serve both to feed the check between the wheels and to mutilate the seal or check by engagement of the teeth of the wheels with the opposite sides of the check.

Fixed upon one of the shafts, 9, 10, as the shaft, 10, is a beveled gear, 11, in engagement with a beveled gear, 12, fixed upon a shaft, 13, at right angles to the shaft, 9, the shaft, 13, having fixed upon one of its ends within the enclosure, 1, one member, 14, of a clutch, the other member, 15, of which is formed upon the end of a crank, 16.

The clutch members, 14 and 15, have mutually engaging beveled toothed faces whereby the shaft, 13, can be rotated in one direction only by means of the crank, 16, and that in a direction to feed a check, 6, between and by means of the toothed-wheels, 7, 8, from the inlet opening, 4, toward the outlet opening, 5, of the enclosure.

By the term check or the like I mean a strip of material bearing indicia identifying, or peculiar to, the particular check of a group or series of like checks; and such a check may be in the form of a seal or other strip bearing the necessary information to adapt it for its intended purpose or use.

Suitable material for such a check is a strip of sheet metal such as tin, sheet brass or the like, and this may be provided with the desired indicia by printing, embossing, perforating or in any other known manner.

Figure 7:
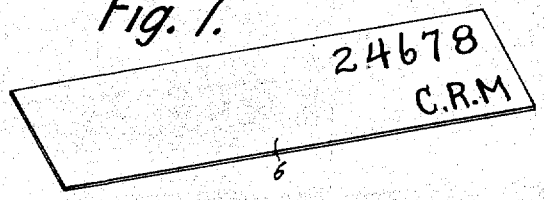
Figure 7 is a view in perspective of a check, or seal for use in the mechanisms shown in Figures 1 to 6 inclusive.
Figure 4:
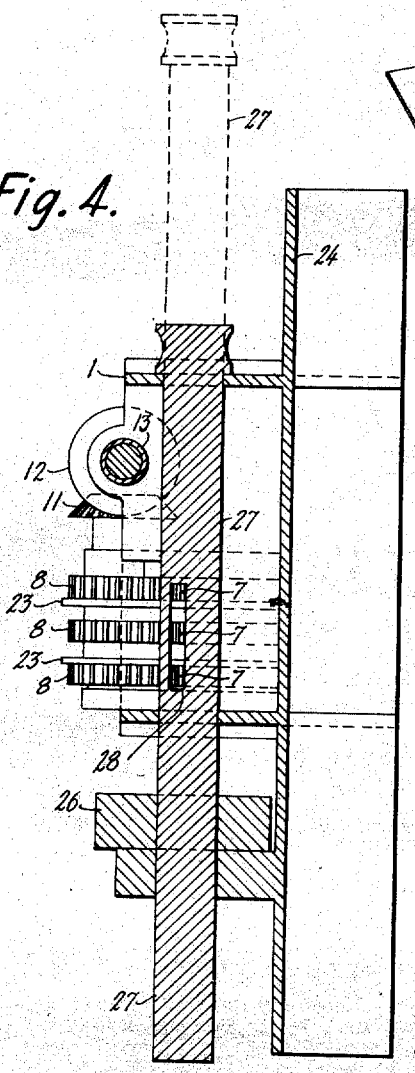
Figure 4 is a vertical cross section taken on the broken line 4—4 in Figure 2.

I have shown in Figure 7 such a check bearing the identifying letters "C. R. M.", and the number "24678".

In use, the check is inserted through the inlet opening, 4, of the enclosure, 1, opposite the inspection opening, 3, into engagement with the toothed wheels, 7 and 8, which are rotated by means of the crank, 16, to feed the check between said wheels toward the outlet opening, 5, until the check is drawn entirely within the enclosure and into such a position that the number 24678 and the letters C. R. M. are visible through the inspection opening, 3.

As the portion of the check or strip which has thus passed between the wheels, 7 and 8, is by the action of the teeth on said wheels mutilated and portions of the strip forced into the grooves between neighboring teeth on the respective wheels and as the wheels can be operated by the crank, 16, only in a direction to feed the strip toward the outlet opening, 5, it will be seen that the strip cannot be removed from the enclosure except by continuing the feeding movement between the toothed wheels until the entire strip has passed therebetween, and can be withdrawn through the outlet opening, 5.

A check or strip thus passed through and out of the enclosure will be mutilated by the teeth on the wheels, 7 and 8, to such an extent that it cannot again be used for its original purpose, and no similar unmutilated check can without detection be substituted within the enclosure for the check which has been thus mutilated unless bearing the same indicia.

If a similar seal or check bearing different indicia be substituted for a check which has been removed in mutilated form from the enclosure, the substitution will be readily detected upon inspection and comparison of the indicia with a preserved record of the same.

To render futile any attempt to withdraw a substantial portion of the check or strip through the inlet opening, 4, I have mounted upon the enclosure wall through which the inlet opening, 4, is formed, an angle lever pivoted at 17, one arm, 18, of which is movable across the inlet opening, 4, and the other arm, 19, of which is in the form of a fork in engagement with a crank-pin, 20, carried by a crank disk, 21, fixed upon the shaft, 13.

Figure 5:
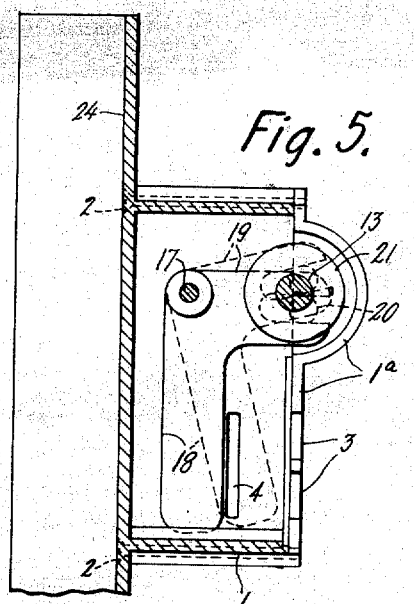
Figure 5 is a vertical cross section taken on the broken line 5—5 in Figure 2.
Figure 6:
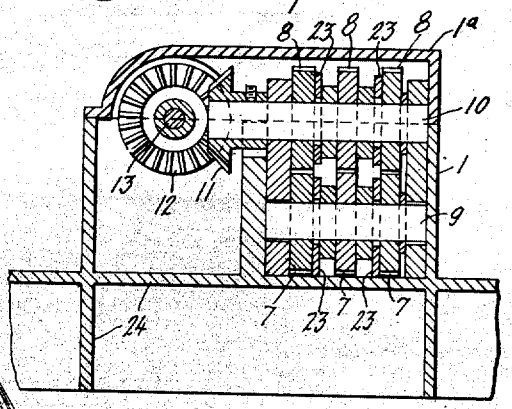
Figure 6 is a vertical cross section taken on the broken line 6—6 in Figure 2.
Figure 8:
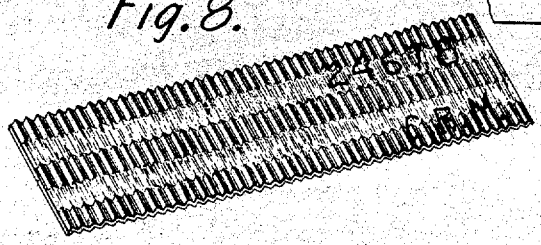
Figure 8 is a similar view of the seal after removal from the remaining mechanism.

The arrangement of the parts is such that as the rear end of the check or strip is drawn through the inlet opening, 4, and past the arm, 18, of the angle lever, said arm of the angle lever will be automatically moved across the inlet opening, 4, to close the same as indicated by dotted lines in Figure 5.

The inspection opening, 3, is preferably closed by a body or plate, 22, of glass or other transparent material.

The forward end of the strip or check in passing through the enclosure may be directed toward the outlet opening, 5, by means of guide-fingers, 23, loosely mounted on the respective shafts, 9 and 10, between which guide-fingers the check or strip is drawn by the feed movement of the wheels, 7 and 8.

In combination with the seal or check, the device may be used to prevent the unauthorized release or removal of locking members of various kinds.

I have shown the enclosure, 1, mounted upon a member, 24, relatively to which a member, 25, is movable, separation of the two members being prevented by means of a hasp, 26, mounted upon the member, 25, which hasp is adapted to be engaged by a locking bolt, 27, slidably movable within the enclosure, 1, transversely of the path of the check or strip, 6, and provided with an opening, 28, adapted to receive the body of the check or strip, 6, when the bolt is in locking position.

In this use of the device, after the bolt has been slid into locking engagement with the hasp, 26, the check, 6, is inserted through the inlet opening, 4, of the enclosure and the opening, 28, in the bolt into feeding engagement with the toothed-wheels, 7 and 8, after which the check, 6, serves to lock the bolt, 27, against withdrawal of the hasp, 26, without destroying the check and as above explained the check cannot be removed without mutilation which destroys it for its original use.

After the bolt, 27, has been thus locked, an inspection through the opening, 3, will readily reveal the absence of a check, a check in broken condition, or substitution for the original locking seal or check of a similar check bearing different indicia.

The mutilating mechanism may be of any known form adapted for destroying the identifying character of the original check, in substantially the manner and for the purpose above set forth.

I do not wish to be limited to the constructions shown and above described, as, for certain purposes of the invention, various changes may be made in the form and arrangement of various parts of the device within the scope of the claims without departing from the spirit of the invention.

What I claim as new and desire to secure by Letters Patents is—

1. In a device of the class described, and in combination, an enclosure provided with an inspection opening, and with an inlet passageway and an outlet passageway at opposite ends of a path for a check through the enclosure past said inspection opening; check-feeding and mutilating means operable in one direction only in said path of the check; and means within the enclosure automatically moved by the movement of the check-feeding mechanism to obstruct said inlet passageway.

2. In a device of the class described, and in combination, an enclosure provided with an inspection opening, and with an inlet passageway and an outlet passageway at opposite ends of a path for a check through the enclosure past said inspection opening; check-mutilating means in said path of the check; and locking mechanism including a movable member projecting interiorly of the enclosure and provided with an opening in the path of, and lockingly engageable with, the check.

3. In a device of the class described and in combination, an enclosure provided with an inspection opening closed by a transparent body, and with an inlet passageway and an outlet passageway at opposite ends of a path for a check through the enclosure past said inspection opening; check-mutilating means in said path of the check; and locking mechanism including a movable member projecting interiorly of the enclosure and provided with an opening in the path of, and lockingly engageable with, the check.

4. In a device of the class described and in combination, an enclosure provided with an inspection opening, and with an inlet passageway and an outlet passageway at opposite ends of a path for a check through the enclosure past said inspection opening; check-feeding and mutilating means operable in one direction only in said path of the check; and locking mechanism including a movable member lockably engaged within the enclosure by a check occupying said path.

5. In a device of the class described and in combination, an enclosure provided with an inspection opening, and with an inlet passageway and an outlet passageway at opposite ends of a path for a check through the enclosure past said inspection opening; check-feeding and mutilating means operable in one direction only in said path of the check; means within the enclosure automatically moved by the movement of the check-feeding mechanism to obstruct said inlet passageway; and locking mechanism including a movable member lockably engaged within the enclosure by a check occupying said path.

6. The combination of a metal check, a housing, said check being wholly and inaccessibly confined within said housing, check-feeding and mutilating means in the bite of which said check is held and by which said check may be advanced and discharged in only one direction from said housing, and locking means including a withdrawable member which is retained within said housing by said check.

7. The combination of a metal check, a housing, check-feeding and mutilating means in the bite of which said check is held and by which said check may be advanced and discharged from said housing, said housing having an inlet opening for said check, and means dependent upon the operation of the check-feeding means for automatically closing and sealing said inlet opening behind said check.

8. The combination of a metal check, a housing, check-feeding and mutilating means in the bite of which said check is held and by which said check may be advanced and discharged from said housing, and a withdrawable locking bolt inserted in said housing, said check interlocking with said housing and said bolt, to prevent withdrawal of the latter.

9. The combination of a metal check, a housing, check-feeding and mutilating means in the bite of which said check is held and by which said check may be advanced and discharged from said housing, and a withdrawable locking bolt extending into said housing and interlocking with said check and held against withdrawal thereby.

10. The combination of a metal check, a housing, check-feeding and mutilating means in the bite of which said check is held and by which said check may be advanced and discharged from said housing, and a locking bolt extending into said housing and interlocking with said check and held against withdrawal thereby, said housing having an interior flange or support against which the edge of said check abuts, to prevent said bolt from displacing the check in edgewise direction.

11. In a sealing device of the class described having a housing provided with a sight opening, the combination of a metal check wholly confined within the housing, means withdrawable to permit insertion of the check and effective to render the inserted check inaccessible, check-feeding and mutilating means in the bite of which said check is held and by which said check may be advanced and discharged from said housing, the feeding and mutilating means being movable only in a direction to advance the check, and locking means including a withdrawable member having means whereby it is retained within said housing by means of said check, said mutilating means being positioned to afford inspection of the unmutilated portion of the check through said sight opening.

12. In a sealing device of the class described having a housing provided with a sight opening closed by transparent material and having an opening to receive a check, the combination of a metal check wholly confined within said housing, check feeding and mutilating means in the bite of which said check is held and by which said check may be advanced and discharged, said feeding and mutilating means being movable only in the direction to advance the check, and being at the opposite side of said sight opening from said check-receiving opening, and locking means controlled by said check, means being provided for rendering the check inaccessible within the housing.

CLARENCE R. MARTINEAU.